Nov. 9, 1948.  A. D. GOODWIN  2,453,368
SPRAY OPERATING MECHANISM
Filed April 26, 1945

INVENTOR
A. D. Goodwin
BY
ATTORNEYS

Patented Nov. 9, 1948

2,453,368

UNITED STATES PATENT OFFICE 2,453,368

SPRAY OPERATING MECHANISM

Alfred D. Goodwin, Manteca, Calif.

Application April 26, 1945, Serial No. 590,439

4 Claims. (Cl. 299—62)

This invention relates in general to improvements in orchard spraying machines.

In particular the invention is directed to, and it is an object to provide, an orchard spraying machine including a tower on which one or more laterally discharging spray nozzles are mounted for power actuated vertical oscillating movement whereby to fully spray the trees as the implement passes by the same.

Another object of the invention is to provide a spraying machine, as above, which includes a novel mechanism for power oscillating the spray nozzles, and to a selectively adjustable extent.

A further object of this invention is to provide a spraying machine, of the type described, wherein the spray nozzles are vertically adjustable on the tower; the aforesaid novel mechanism for oscillating the nozzles being operative in any position of vertical adjustment thereof.

A further object of the invention is to produce a simple and inexpensive device and yet one which will be exceedingly effective for the purpose for which it is designed.

These objects are accomplished by means of such structure and relative arrangement of parts as will fully appear by a perusal of the following specification and claims.

In the drawings similar characters of reference indicate corresponding parts in the several views.

Figure 1:
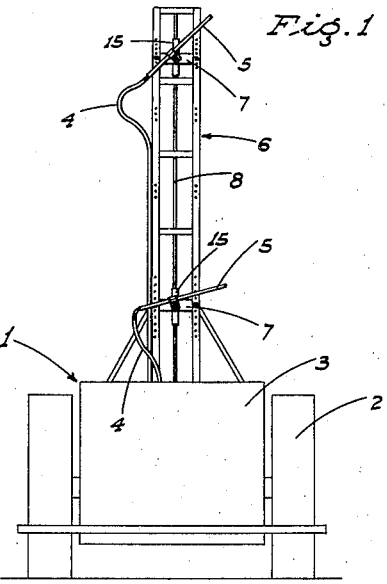
Figure 1 is an end view of an orchard spraying machine embodying the invention.
Figure 2:
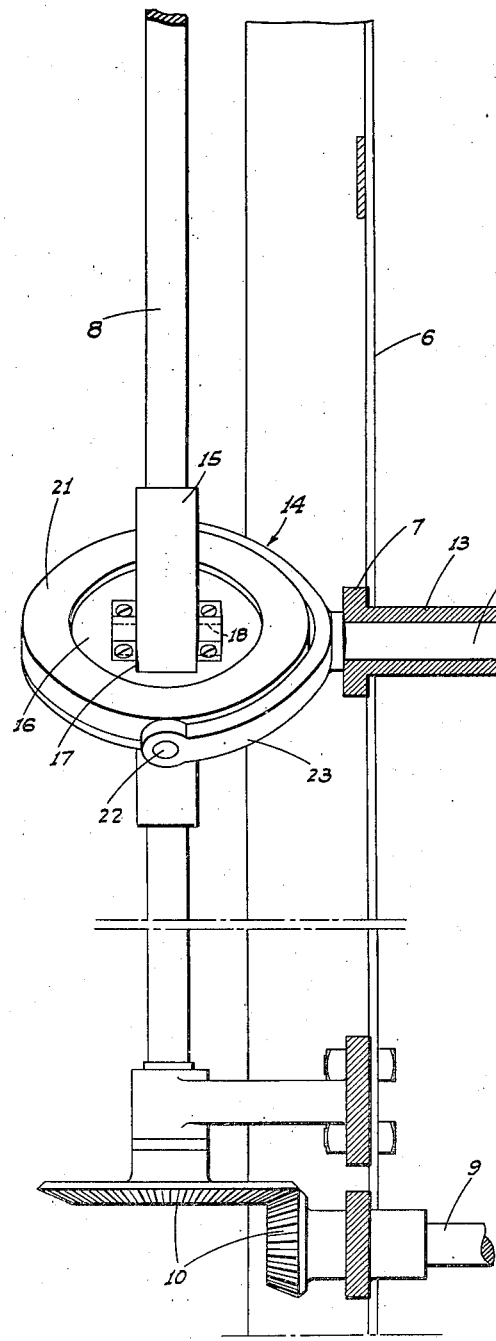
Figure 2 is an enlarged sectional elevation of the tower, illustrating the associated nozzle oscillating mechanism.
Figure 3:
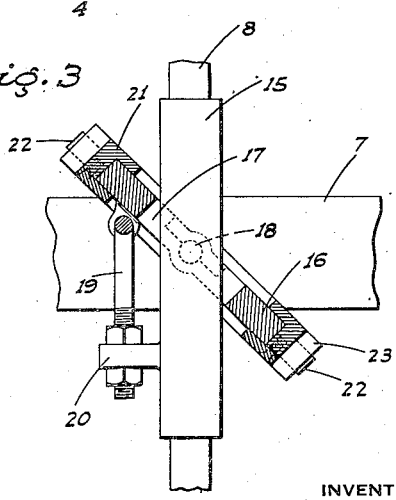
Figure 3 is an enlarged end view of the wobble plate unit which is included in the nozzle oscillating mechanism; said unit being in section.

Referring now more particularly to the characters of reference on the drawings, the orchard spraying machine is indicated generally at 1, and is supported by ground engaging wheels 2. The machine includes a tank 3 from which fluid spray is delivered under pressure by hoses 4 to laterally projecting, vertically spaced nozzles 5 mounted on a tower 6 by means of vertically adjustable cross bars 7. The means of mounting the nozzles on the cross bars 7 will hereinafter appear in detail.

A vertical, rotary shaft 8 is journaled in the tower and is driven from the spray machine engine (not shown) by a horizontal drive shaft 9 and a bevel gear assembly 10 coupled to the lower end of shaft 8.

The nozzles 5 are each secured transversely on the outer end portion of a horizontal rock shaft 11 by means of a clamp unit 12 which may be adjusted in its position about said shaft; the shafts 11 extending into the tower 6 through guide and supporting sleeves 13 projecting horizontally outward from the cross bars 7.

Rotary motion of the vertical shaft 8 is converted to rocking motion of each shaft 11, and consequent vertically oscillating movement of the corresponding nozzle 5, by a wobble plate unit indicated generally at 14, and which comprises the following:

The shaft 8 is square in cross section and a matching sleeve 15 is slidable thereon; said sleeve projecting centrally through an elongated slot 17 in a circular, diagonally disposed wobble plate 16, and being pivoted in driving connection with the same by opposed horizontal trunnions 18 on said sleeve pivotally secured to the wobble plate 16 on opposite sides of slot 17.

The diagonal position of the wobble plate 16 is normally but adjustably maintained by means of an adjustable link 19 which connects between said plate and an ear 20 on one side of sleeve 15.

The wobble plate 16 is rotatably engaged in a channeled ring 21 pivoted at opposed points by trunnions 22 within a yoke 23 fixed centrally on the inner end of the rock shaft 11.

With rotation of shaft 8 and the wobble plate 16, the yoke supported ring 21 rises and falls alternately on each side causing rocking motion of shaft 11, and the desired vertical oscillation of the corresponding nozzle 5.

The throw of the wobble plate 16, and consequently the extent of oscillating movement of the corresponding nozzle, may be varied by adjusting the diagonal angle of said plate; such adjustment being accomplished by changing the effective length of link 19.

The nozzles 5 are vertically adjusted by changing the position of the cross bars 7 on the tower; such adjustment being made without interfering with the nozzle oscillating mechanism for the reason that the same moves with the cross bar, and with the sleeve 15 correspondingly sliding up or down the shaft 8.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the fol- lowing is claimed as new and useful and upon which Letters Patent is desired:

1. A spray machine including an upstanding tower, a vertically adjustable supporting member on the tower, a horizontal rock shaft journaled on the supporting member, a nozzle secured transversely on the rock shaft, and power means operative to rock said shaft irrespective of the position of vertical adjustment of the supporting member; said power means including a driven vertical shaft mounted in connection with the tower, said driven shaft having a vertically slidable but relatively non-rotatable sleeve thereon, and a wobble plate unit connected between said sleeve and the rock shaft.

2. A spray machine comprising an upstanding tower, a supporting element, clamping means for securing the supporting element in selective vertically adjusted positions on the tower, a horizontally disposed sleeve mounted on the supporting element, a rock shaft journaled in the sleeve, a nozzle fixed to the rock shaft transversely thereof whereby the nozzle will be vertically oscillated with the rocking of the shaft, a vertically upstanding shaft extending substantially parallel to the tower, such shaft being square in cross section, means whereby rotary movement may be imparted to said vertical shaft, a second sleeve, the bore of said second sleeve being square in cross section and having a sliding fit over the vertical shaft, a wobble plate mounted axially of the sleeve and diagonally thereof, and connections between the wobble plate and rock shaft to impart a rocking movement to the latter upon rotation of the vertical shaft.

3. A spray machine as in claim 2, including journal means between the wobble plate and the second named sleeve whereby the diagonal position of the wobble plate may be adjusted, an ear on the sleeve, and a link on the wobble plate, said link being adjustably mounted through the ear.

4. A spray machine comprising an upstanding tower, a supporting element, clamping means for securing the supporting element in selective vertically adjusted positions on the tower, a horizontally disposed sleeve mounted on the supporting element, a rock shaft journaled in the sleeve, a nozzle fixed to the rock shaft transversely thereof whereby the nozzle will be vertically oscillated with the rocking of the shaft, an upstanding shaft disposed in substantial parallelism with the tower, power means operative to impart motion to said upstanding shaft, and means connected between the upstanding shaft and the rock shaft and operative to convert the rotary movement of the upstanding shaft to a rocking movement of the rock shaft, such last named means comprising a circular wobble plate mounted in driven relation on the upstanding shaft co-axially with and diagonally thereof, a ring turnable on the wobble plate, opposed trunnions on the outer circumference of the ring, a yoke having its arms pivoted on said trunnions, said yoke being fixed to said rock shaft.

ALFRED D. GOODWIN.

REFERENCES CITED

The following references are of record in the file of this patent:

UNITED STATES PATENTS

| Number | Name | Date |
|---|---|---|
| Re. 22,039 | Vaage | Feb. 24, 1942 |
| 1,580,478 | Fox et al | Apr. 13, 1926 |
| 1,900,837 | Mills | Mar. 7, 1933 |
| 2,039,768 | Bird | May 5, 1936 |
| 2,118,955 | Vick | May 31, 1938 |
| 2,234,836 | Vick | Mar. 11, 1941 |
| 2,363,776 | Dale | Nov. 28, 1944 |
| 2,365,755 | Griffith | Dec. 26, 1944 |
| 2,367,135 | Moon et al | Jan. 9, 1945 |
| 2,369,950 | Daly | Feb. 20, 1945 |